J. H. SNYDER.
Horse-Collar.
No. 222,323.                    Patented Dec. 2, 1879.
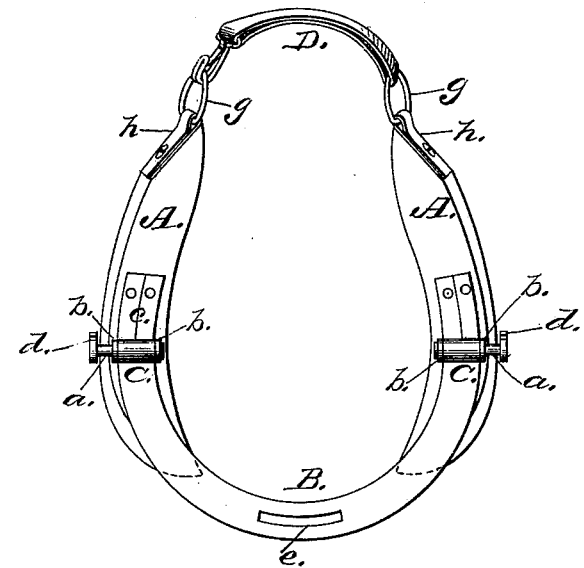
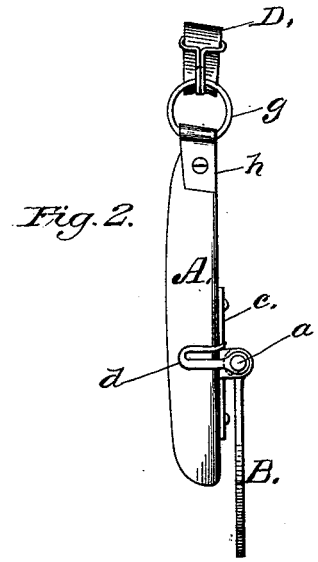

UNITED STATES PATENT OFFICE.

JOHN H. SNYDER, OF FRUITPORT, MICHIGAN.

IMPROVEMENT IN HORSE-COLLARS.

Specification forming part of Letters Patent No. 222,323, dated December 2, 1879; application filed October 18, 1879.

*To all whom it may concern:*

Be it known that I, JOHN H. SNYDER, of Fruitport, in the county of Muskegon and State of Michigan, have invented a new and valuable Improvement in Horse-Collars; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my improved horse-collar, and Fig. 2 is a side view thereof.

The nature of the invention consists in a horse-collar composed of a curved hinged bail secured to the pads on each side thereof, and having outwardly-extended journals, and trace-hooks pivoted to the ends of said journals, the hinged upper rings, a connecting-strap passing through said rings, and a slot formed in the lower central portion of said bail, adapted to receive a breast-strap, as hereinafter shown and described.

In the annexed drawings, the letters A A designate the pads, which are constructed with wooden bodies and leather coverings of substantially the shape shown in the drawings, designed to fit the horse's shoulders, but shorter than such pads are usually made, so as not to bind the horse's neck above or below. To hold these pads in proper relative position a strong curved bar or bail, B, is employed, this bar being connected to each pad at about its middle portion, by means of a strong transverse hinge or hinge-joint, C.

Each hinge may be constructed by bending the end of the connecting bar or bail B tightly around the journal $a$, the latter bearing in lugs or ears $b$, raised from the plate or plates $c$, attached to the face of the pad on each side, so that the journals $a$ will extend transversely and in line with each other, and the pads will have an easy and true vibratory motion forward and backward, without lateral movement, thereby conforming, as much as possible, to the natural movements of the animal's shoulders.

To the outer ends of the journals $a$ are attached the trace-hooks $d$, and the lower portion or bend of the connecting-bar B is slotted, as shown at $e$, to receive the breast-strap.

To the upper end of each pad is hinged a ring, $g$, the connection being made by a metallic tip, $h$, attached to the outside of each pad. Through these rings passes the connecting-strap D at the upper end of the collar.

The bend of the connecting-bar B is deep enough to extend beyond the ends of the pads, and wide enough to extend around the horse's neck, so as not to bind thereon, its bearings being arranged transversely in line with each other, so that neither its vibrations nor those of the pads will produce any lateral rocking of the latter on the animal's shoulders.

What I claim, and desire to secure by Letters Patent, is—

In a horse-collar, the curved hinged bail B, secured to the pads, and having outwardly-extended journals $a$ and slot $e$ formed in its lower central portion, and the trace-hooks $d$, pivoted to the ends of said journals, in combination with the short pads A, the hinged upper rings $g$, and the connecting-strap D, passing through said rings, substantially as specified.

In testimony that I claim the above I have hereunto subscribed my name in the presence of two witnesses.

JOHN H. SNYDER.

Witnesses:
SIGEL F. CULVER,
D. C. McLAUGHLIN.